Feb. 12, 1924.
J. C. FITZGERALD
COW STANCHION
Filed Jan. 5, 1923
1,483,292
2 Sheets-Sheet 1
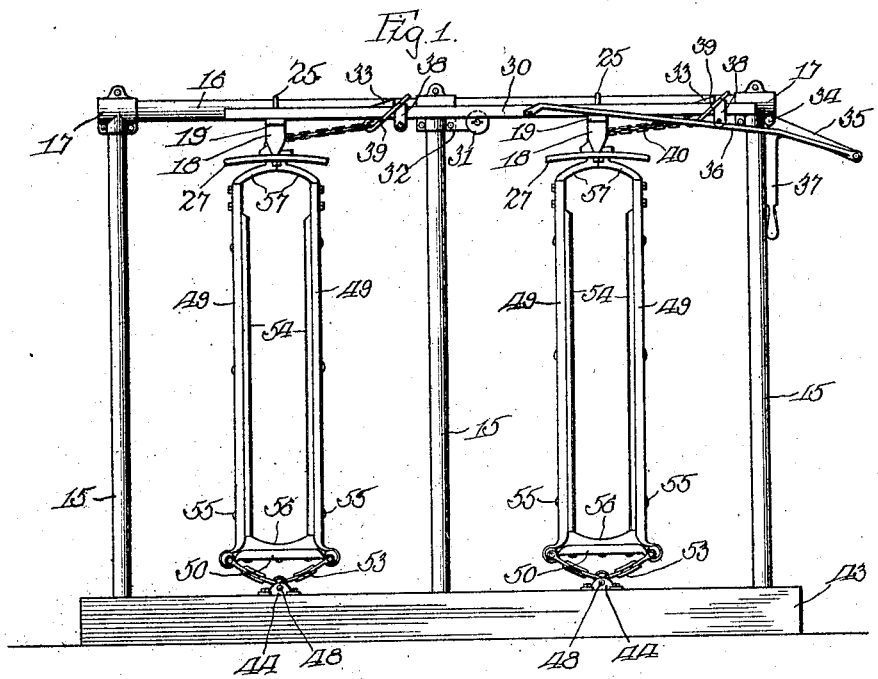
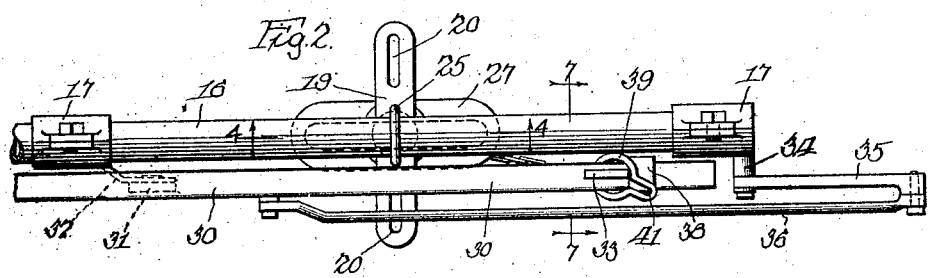
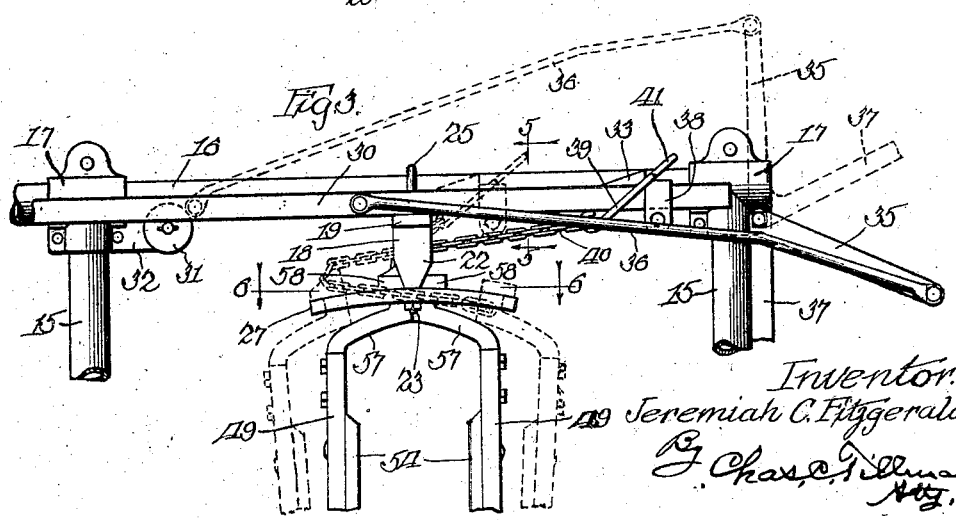
Inventor:
Jeremiah C. Fitzgerald Feb. 12, 1924.
J. C. FITZGERALD
COW STANCHION
Filed Jan. 5, 1923
1,483,292
2 Sheets-Sheet 2
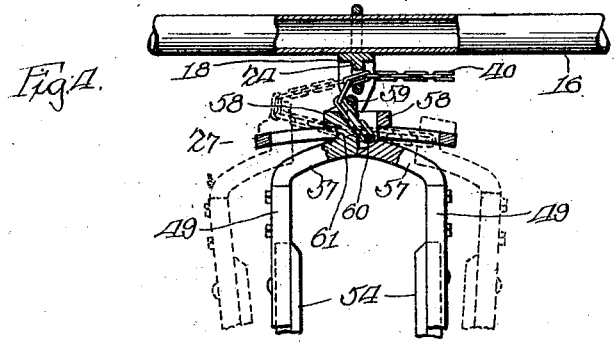
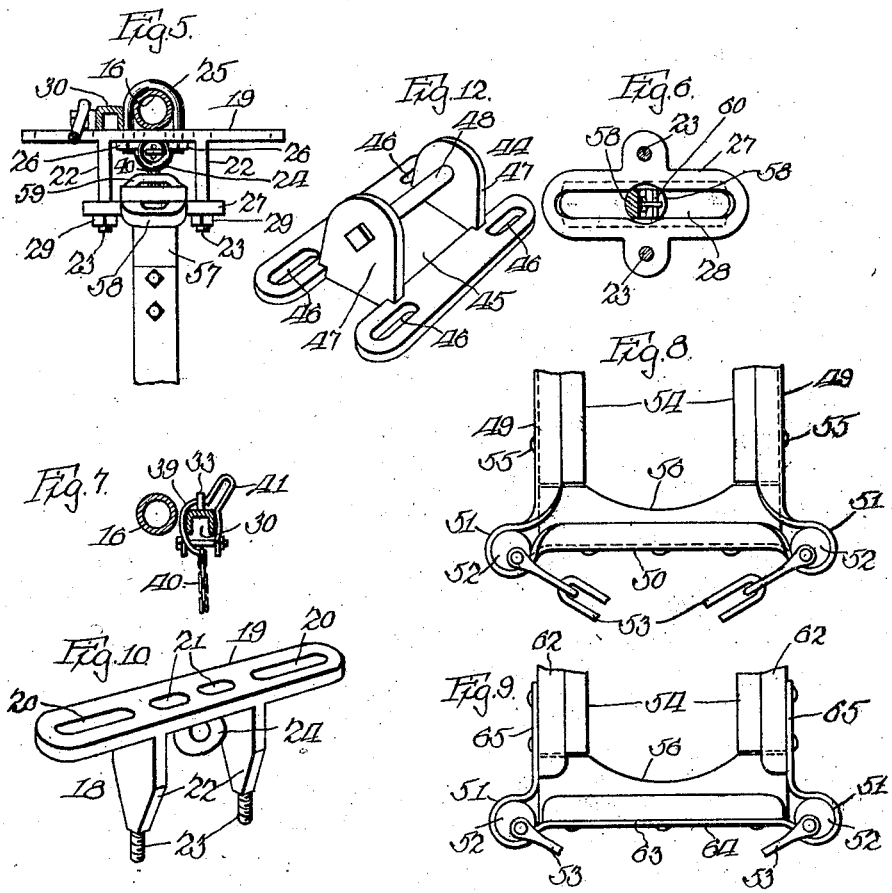
Inventor:
Jeremiah C. Fitzgerald
By Chas. Q. Tillman
Atty Patented Feb. 12, 1924.

1,483,292

UNITED STATES PATENT OFFICE.

JEREMIAH C. FITZGERALD, OF DUBUQUE, IOWA.

COW STANCHION.

Application filed January 5, 1923. Serial No. 610,760.

*To all whom it may concern:*

Be it known that I, JEREMIAH C. FITZGERALD, a citizen of the United States, and a resident of Dubuque, in the county of Dubuque and State of Iowa, have invented certain new and useful Improvements in Cow Stanchions, of which the following is a specification.

This invention relates to improvements in cow stanchions of the type in which a single stanchion is vertically located at the front or feeding end of each of a plurality of stalls arranged side by side for the purpose of so holding an animal by the neck, as to prevent its egress from the stall, yet, in such a manner as to permit of its more or less free movement in feeding and in lying down or getting up.

Heretofore, the stanchions generally employed in the above named manner and for a like purpose, have been of such construction that one of the upright bars of each stanchion was mounted against lateral movement near the manger, while the other bar thereof was mounted at one side of the first named bar for pivotal lateral movement, so that the said bars could be so spaced one from the other, that an animal on entering the stall and advancing to the front end or manger thereof, would place its head between said bars, after which, the movable bar would be moved towards the other one and fixed, so as to hold the neck of the animal there-between. In this common construction, a "cow-stop" or an upright stop-bar located between one or both of the stanchion bars and the adjacent wall of the stall was required to cause the animal to place its head between the stanchion-bars instead of to one side thereof.

My invention has among its objects to overcome the above named defects or objectionable features, by providing a stanchion that may be pivotally hung and when desired to receive an animal, may be caused to stand with its stanchion bars separated and against pivotal movement and in such a way that the separated bars will occupy such relative positions to the side walls of the stall in which the stanchion is located, that the animal will be forced to place its head between the stanchion bars on entering the stall, thereby obviating the use of the ordinarily used cow-stops. Also, to provide a stanchion of such construction that it may be adjusted back and forth with respect to the manger for the accommodation of animals of different lengths. To furnish a stanchion the bars of which will be automatically opened and of such construction that they may be lined with wood on the inner surfaces of their sides, as well as at their juncture at the bottom thereof.

A further object of the invention is to provide means, when a plurality of the stanchions are employed in a row at the feeding end of a plurality of stalls, for releasing or closing all of them simultaneously. A still further object is to provide means whereby a single stanchion can be opened to release an animal or closed on the neck of an animal without interference with the others.

Various other objects and advantages of the invention will be disclosed in the following description and explanation.

In the drawings,—

Fig. 1 is a view in front elevation showing a stanchion embodying the invention mounted at the front or feeding end of each of a pair of stalls, the said stalls being located side by side and the stanchions in a transverse line with respect to the stalls.

Fig. 2 is an enlarged plan view showing one of the stanchions and one of the stalls only.

Fig. 3 is a view in side elevation of the upper portion of one of the stanchions and the upper part of its supporting frame or stall, illustrating by dotted lines about the positions the parts will occupy when the stanchion bars are separated in order to release an animal or for the purpose of permitting it to place its head between said bars, and by continuous lines the locked position of the stanchion.

Fig. 4 is a fragmental sectional view taken on line 4—4 of Fig. 2 looking in the direction indicated by the arrows, showing the stanchion bars, by dotted lines, in their released or open positions, and by continuous lines in their locked positions.

Fig. 5 is a cross-sectional view partly in elevation taken on line 5—5 of Fig. 3 as indicated by the arrows.

Fig. 6 is a detail view partly in section taken on line 6—6 of Fig. 3.

Fig. 7 is a cross-sectional view taken on line 7—7 of Fig. 2 looking in the direction indicated by the arrows.

Fig. 8 is a view in elevation of the lower portion of the stanchion, showing the chain for loosely connecting it to the floor or a suitable support broken for the convenience of illustration.

Fig. 9 is a similar view illustrating a modification in the construction of the stanchion bars.

Fig. 10 is a detached perspective view of the hanger for the upper ends of the stanchion bars.

Fig. 11 is a detail view of a locking link or member employed in connection with the releasing and locking mechanism for the stanchion bars, and Fig. 12 is an enlarged detached perspective view of the adjustable base to which the lower portion of the stanchion is loosely connected.

Corresponding numerals of reference refer to like parts throughout the different views of the drawings.

The supporting frame for each of the stanchions includes upright posts 15 located in spaced relation with one another at the front ends of the stalls and a horizontally disposed bar 16 transversely mounted on the upper portions of said posts and preferably secured thereto by means of T-couplings 17 as is shown in Figs. 1 to 3 inclusive of the drawings. The posts 15 and supporting bar 16 are by preference made of tubular material for the purpose of lightness and strength.

Mounted on the supporting rod 16 about midway between each pair of the posts 15 and depending from said rod, is a transversely disposed hanger which is designated as a whole by the numeral 18, and each comprises a horizontally disposed plate 19 having in each of its extremities a longitudinally extended slot 20 and between said slots a pair of spaced elongated openings 21 as will be readily understood by reference to Fig. 10 of the drawings.

The plate 19 has depending from its lower surface a pair of spaced arms 22 each of which terminates at its free end in a reduced screw-threaded portion 23 for engagement with securing nuts for the purpose to be presently explained. Midway between the arms 22 the plate 19 is provided with a depending orificed member 24, the eye or orifice of which member is presented towards the sides of said plate. Each of the hangers 18 is secured to the supporting bar 16 by means of an inverted U-shaped member 25, which member strides the supporting bar 16 and has its legs extended through the openings 21 and secured in position by means of nuts 26 engaging the screw-threaded ends of said member. The screw-threaded ends 23 of the arms 22 are extended through suitable openings in a horizontally disposed plate 27 which is provided with a slot 28 located transversely with respect to the plate 19 of the hanger. Securing nuts 29 on the ends of the screw-threaded portions 23 of the arms 22 are employed to hold the plate 27 securely in position on said arms. As is clearly shown in Figs. 1, 3, and 4 of the drawings, the slotted plate 27 of each of the hangers is slightly arcuate for the purpose of permitting lateral movement of the stanchion bars, the upper ends of which bars are located in the slot 28 of said plate and are guided thereby.

Slidably mounted in parallelism with the support 16 on the upper surface of the plates 19 of the hangers is a sway-bar 30 which is preferably channeled in its lower surface, see Figs. 5 and 7 of the drawings. The sway-bar 30 is by preference mounted on the plates 19 rearwardly from the front ends of the stalls and is further horizontally supported and guided by means of a roller 31 journaled on an arm 32 extended horizontally from one of the posts 15 of the supporting frame. By this arrangement it is manifest that the roller 31 will not only assist in supporting the sway-bar 30 but as it tracks in the channel of said bar, it will assist in guiding the same in its movement transversely with respect to the hangers and stanchions. For each stall or stanchion the bar 30 is provided with an upwardly extended catch 33, each of which, as is clearly shown in Figs. 1 and 3 of the drawings, has an inclined surface extended longitudinally with respect to the bar 30 and terminates at one of its ends abruptly or at a right angle to the said bar.

Pivotally secured to the upper portion of the supporting frame for the apparatus and preferably to a shaft 34 extended horizontally and rearwardly from one of the T-couplings 17 of said frame, is a bell crank lever to one arm 35 of which is pivotally secured one end of a rod 36 the other end of which is pivotally secured to the sway-bar 30 at a suitable distance from the fulcrum of said bell crank lever.

The other arm 37 of the bell crank lever constitutes the operating handle or lever for shifting the position of the sway-bar 30 and thereby causing the closure or release of the stanchion bars.

The catches 33 are narrow and may be adjustably fixed on the bar 30 by means of clips 38 clamped around the bar 30 and a portion of the clip 33 extended from its abrupt end under said clip. These catches are for co-operation with a link or loop-like member 39 which is connected to one end of a flexible connection such as a chain 40 employed for drawing together the upper ends of the stanchion bars and for holding them in their closed positions. The member 39, see Fig. 11, is provided with a looped extension 41 of sufficient size to permit one of the catches 33 passing through said extension when the same is brought into alignment with the catch. The member 39 has a hook 42 at one of its ends to engage one of the links of the chain 40 to which said member is connected.

Mounted directly under each of the hangers 18 on a suitable horizontal support 43 is a hanger for the lower portion of each of the stanchions, which hanger is designated as a whole by the numeral 44 and consists of a substantially rectangular plate 45 having at each of its sides a pair of longitudinally extended slots 46, see Fig. 12, for the reception of bolts used for securing the hanger to the support 43 or floor of the stall. Near each of its ends the plate 45 of each hanger 44 is provided with an upright 47 which are connected together by means of a rod 48. The hangers 44 are located on the support 43 so that their lengths will be transversely disposed with respect to the supporting bar 16 and by reason of the elongated slots 46 in the base plates of said hangers, it is manifest that they can be adjusted back and forth with respect to the manger.

Each of the stanchions includes in its structure a pair of spaced clamping bars 49 by preference of U-bar steel. These bars are united at their lower ends by a horizontally and transversely disposed portion 50 and outwardly extended spring portions 51, all of which parts being formed of a unitary piece or in other words, are integral. It will be understood that the connecting portion 50 as well as the bars 49, are of U-bar steel and have their channels presented inwardly. Each of the spring portions 51 of each of the stanchions has transversely located therein a roller 52 to which are secured the ends of a chain 53 loosely connected to the rod 48 of the hanger 44 so as to permit of swinging or pivotal movement of the stanchion. Located in each of the channels of each of the bars 49 is a lining member 54 of wood or other suitable material which can be secured in place by means of screws 55 extended through suitable openings in the bars 49 and engaging said lining members.

As the channel of the transverse portion 50 of the stanchion is presented upwardly, it is manifest that a lining member of wood or other suitable material 56 can be secured therein by means of screws or otherwise. The upper end of each of the stanchion bars 49 is equipped with an inwardly extended portion 57, each of which portions terminates at its free end with an upwardly extended head 58 and when viewed from above, said heads are substantially semicircular in shape with their flat edges designed to meet one another. One of the heads 58 is provided with a loop 59 through which the chain or flexible connection 40 is passed after having been extended through the eye or orificed member 24 of the hanger 18 for the upper end of the stanchion. The other head 58 is provided with a horizontally disposed pin 60 to which the lower end of the chain or connection 40 is permanently attached. Just below the heads 58 each of the portions 57 is provided with a reduced neck 61, see Fig. 4 of the drawings, for co-operation with the slot 28 in the guide-piece 27 for the upper portions of the stanchion bars.

In Fig. 9 of the drawings I have shown a modification in the construction of the stanchion, which consists in employing a pair of spaced uprights 62 of any suitable material, which may be lined with wood pieces 54 as in the other construction. In this modification a connection for the lower ends of the bars 62 consisting of a single piece of steel 63, is employed. This connection as shown in Fig. 9 is provided with a horizontally and transversely disposed portion 64 having at each of its ends an upward extension 65, which extensions are secured to the bars 62 near the lower ends of said bars, and said extensions are united to the transverse portion 64 by means of spring loops 51 as in the construction shown in Fig. 8 and above described. The chain 53 for connecting the lower portion of the modified form of the stanchion to the base hanger, is connected at its ends to the spring loops 51 in the same manner as above set forth. In this modification, the horizontal portion 64 of the connection for the stanchion bars has secured on its upper surface, a lining 56 of wood or other suitable material.

By providing the plate 19 of each of the hangers 18 for the upper ends of the stanchions with longitudinally extended slots 20, as well as the elongated openings 21, it is manifest that if it is desired to adjust one or more of the hangers with respect to the manger, all that is necessary is to remove the securing member 25 from the openings 21, when the hanger 18 can be moved forwardly or backwardly to the desired position, after which the legs of the securing member 25 can be inserted through one of the slots 20 and secured in place by means of the nuts 26 on the lower ends of said legs, or if desired, one of the legs of said securing member may be inserted through one of the openings 21 and the other leg of said member through the adjacent opening 20 in which position the member may be firmly secured by means of the nuts on the lower ends of its legs.

As before stated, the base hanger 44 can be adjusted longitudinally on the floor or support therefor by moving it in the proper direction on the bolts extended through the openings 46 in said hanger, when by tightening up the bolts, the hanger may be fixedly secured in position. By this arrangement it is manifest that the upper and lower hanger of each stanchion can be correspondingly adjusted so that animals of different lengths may be accommodated.

From the foregoing and by reference to the drawings, it will be readily understood and clearly seen that by my improvements, a bodily swinging or pivoted stanchion is provided, and also one in which both of the stanchion bars are movable laterally so as to occupy positions near enough the walls of the stall in which the stanchion is located, to obviate the necessity of using the ordinary cow-stops. It will further be understood that by my improvements I afford a stanchion which automatically opens or separates the stanchion bars, and when so separated, will be maintained in a position against pivotal movement in a vertical plane, until it is desired to close and lock the bars, when it is apparent that a pivotal or rotary motion in a vertical plane of the stanchion will be afforded for the comfort of the animal held thereby.

By the employment of the lever operated sway-bar 30 and the co-operation of its catches with the flexible connections uniting the upper ends of the bars of each stanchion, it will be understood that when the lever 37 and its associated parts occupy about the positions shown by dotted lines in Fig. 3 of the drawings, the spring actuated stanchion bars will automatically assume the positions shown by dotted lines in Fig. 3, in which positions the guide-member 27 will hold the stanchion bars against pivotal movement. When it is desired to lock the bars of the stanchion, all that is necessary is for the lever 37 to be moved from the dotted line position shown in Fig. 3 to that illustrated by continuous lines in said figure, in which operation it is manifest that the catches 33 on the sway-bar 30, will engage the links 39, thus causing the connections 40 to be drawn through the eyes 24 of the hangers and at the same time through the loops 59 on the heads 58 of one of the stanchion bars, thus causing the heads 58 of the other stanchion bars to which the connection is permanently attached, to be drawn towards the looped heads until their faces meet, in which position the stanchion bars will be securely held or locked. If it is desired to release or open the bars of an individual stanchion, all that is necessary is to place the loop 41 of the link or loop-like member 39 in register with the catch 33 engaged by said member, when it is manifest the said member can be moved in such a way as to cause the catch to pass through the loop 41 to the end that the connection 40 will be slackened and thus permit the stanchion bars to automatically open or separate. To lock an individual stanchion, the reverse operation is employed.

Having thus fully described my invention, what I claim as new and desire to secure by Letters Patent is—

1. The combination with a stall having at the upper and lower portions of one of its ends horizontally and transversely disposed supports, of a hanger mounted on each of said supports for longitudinal adjustment with respect to the stall, a pair of spaced upright stanchion bars united at their lower ends for causing their upper portions to automatically move from each other and to normally maintain separated positions loosely connected at their ends to said hangers, and a slotted guide-bar mounted on the upper hanger transversely with respect to the stall and engaging the upper portions of said bars to prevent pivotal movement on a vertical axis of the bars when the same are in their separated positions but to permit of such movement when said bars are closed.

2. The combination with an upper and lower horizontally disposed support, of a hanger mounted on each of said supports for transverse adjustment with respect to the supports, a pair of spaced upright stanchion bars united at their lower ends for causing their upper portions to automatically move from each other and to normally maintain separated positions, loosely connected at their ends to said hangers, a guide horizontally mounted on the upper hanger longitudinally with respect to the upper support and engaging the upper portions of said bars to prevent pivotal movement on a vertical axis of the bars when the same are in their separated positions but to permit of such movement when said bars are closed.

3. The combination with an upper and lower horizontally disposed support, of a plurality of stanchions mounted in spaced relation on said supports, each of said stanchions comprising a pair of spaced upright bars united at their lower ends to cause their upper portions to automatically move from each other and to normally maintain separated positions, each of said stanchions loosely connected at its lower end to the lower support, a guide horizontally and longitudinally mounted on the upper support and engaging the upper portions of each pair of the stanchion bars to prevent pivotal movement in a vertical plane thereof when the same are in their separated positions, a sway-bar mounted for slidable longitudinal movement along the upper support and having a plurality of spaced beveled catches on one of its surfaces, a bell crank lever fulcrumed near one end of said sway-bar, a connection pivoted at one of its ends to one arm of said lever and at its other end to the sway-bar, an orificed member depending from the upper support near the upper end of each stanchion, a flexible connection secured at one of its ends to the upper end of one of the stanchion bars and slidably engaging the upper end of the other bar of each stanchion, said flexible connection extended through said orificed member, and a link-like member loosely surrounding the sway-bar and connected to the said flexible connection at its free end, said member having a looped extension for co-operation with one of said catches on the sway-bar.

4. A cow stanchion consisting of a pair of substantially parallel clamping members made of a single piece of U-bar steel with the channeled portion presented inwardly, the said clamping members being integrally united at one of their ends by a transversely disposed portion having at the juncture of its ends with the adjacent ends of said members outwardly extended spring loops.

5. A cow stanchion consisting of a pair of substantially parallel clamping members made of a single piece of U-bar steel with the channeled portion presented inwardly, the said clamping members being integrally united at one of their ends by a transversely disposed portion having at the juncture of its ends with the adjacent ends of said members outwardly extended spring loops, a lining strip fitted and secured in each of the channels of said clamping members, and a lining strip secured on the upper surface of the transverse portion of the stanchion.

6. A cow stanchion comprising a pair of upright stanchion bars, a sway rod mounted for horizontal movement near the upper ends of said bars, a movable catch located on said rod, a loop encircling the rod and having a looped extension, a flexible connection attached at one of its ends to the upper end of one of the stanchion bars, operatively engaging the upper end of the other stanchion bar and attached at its other end to said loop for the purpose of locking the stanchion bars when the loop is engaged by the catch and so arranged that by moving the loop sidewise, till its looped extension co-incides with the catch, the latter may pass through the looped extension and release the stanchions.

7. A pair of upright stanchion bars operatively connected at their lower ends, said bars and their connection being made of metal, and a wood covering on the upper surface of said connection to protect the cow's neck while lying down.

8. A pair of upright stanchion bars connected together at their lower portions by a transverse part, an enlarged opening at the juncture of the bars and said transverse portion, a chain loosely fastened in each of said openings and secured to a floor or curb for the purpose of holding the stanchions against sidewise movement.

9. A cow stanchion comprising a pair of upright stanchion bars, a sway rod for horizontal movement near the upper ends of said bars, a movable catch located on said rod, a loop encircling the rod and having a looped extension, a flexible connection attached at one of its ends to the upper end of one of the stanchion bars operatively engaging the other end of the other stanchion bar and attached at its other end to said loop for the purpose of locking the stanchion bars when the loop is engaged by the catch.

JEREMIAH C. FITZGERALD.